Dec. 29, 1942. C. W. SEWELL 2,306,644
ACTUATING MEANS FOR A CHANGE-SPEED MECHANISM
Filed July 1, 1940 3 Sheets-Sheet 1

Inventor
Charles W. Sewell
by Mawhinney & Mawhinney
Attorneys.

Inventor
Charles W. Sewell
by Mawhinney & Mawhinney
Attorneys.

Dec. 29, 1942. C. W. SEWELL 2,306,644
ACTUATING MEANS FOR A CHANGE-SPEED MECHANISM
Filed July 1, 1940 3 Sheets-Sheet 3

Inventor
Charles W. Sewell
by Mawhinney & Mawhinney
Attorneys.

Patented Dec. 29, 1942

2,306,644

UNITED STATES PATENT OFFICE 2,306,644

ACTUATING MEANS FOR CHANGE-SPEED MECHANISMS

Charles William Sewell, Staines, England, assignor to Lagonda Motors Limited, Staines, Middlesex, England Application July 1, 1940, Serial No. 343,506
In Great Britain May 17, 1940

3 Claims. (Cl. 74—473)

This invention relates to actuating means for a change-speed mechanism, of the kind in which at least one of the "speeds" is introduced by means of positive clutch elements and an electromagnetic friction clutch for synchronizing the positive clutch elements.

The actuating means of the invention is particularly applicable to a change-speed mechanism of the kind having a double-acting positive clutch element by the movement of which two different "speeds" can be selected, each positive clutch having an electromagnetic friction clutch for synchronizing purposes.

Examples of this kind of change-speed mechanism are disclosed in the specification accompanying co-pending patent application No. 306,571, filed November 28, 1939.

Our main object is to provide a simple actuating means therefor.

According to the invention, as applied to a change-speed mechanism in which at least one "speed" is introduced by means of a positive clutch having a synchronizing friction clutch which is electromagnetically-operated, a switch mechanism for controlling the energization of the electromagnet is operable by an actuating member having a lost-motion connection with the movable positive clutch element, such that movement of the actuating member in the appropriate direction will first actuate the switch mechanism and then, on synchronization being obtained, the movable positive clutch element. In the case of a change-speed mechanism having a double-acting positive clutch element as aforesaid, the energization of the electromagnets is selectively controlled by two switch mechanisms having a common actuating member fast on a rod rotatable in one or the other direction to operate the switch mechanisms, respectively, the rod having a lost-motion connection with the double-acting positive clutch element, such that rotation of the rod in either direction will first energize the appropriate electromagnet and then, on synchronization occurring, actuate the associated positive clutch. The lost-motion connection may include an arm fast on the rod and extending with clearance between the limbs of a fork rotatably mounted on the rod, the fork being connected for actuating the double-acting positive clutch element. Preferably the actuation of the said clutch element is effected through a selector fork bar which is biassed against endwise movement in any convenient manner, as by means of a spring-pressed ball engaging a notch in the bar, and compression springs are conveniently interposed between the arm and the limbs of the fork, the springs being supported by screws carried by the fork and serving as stops to limit the lost motion.

Obviously, in the case of a change-speed mechanism having equivalent means for introducing a third "speed," the rod aforesaid should be axially movable for switch- and "speed"-selecting purposes, the fork being endwise fast on the rod so as to be moved thereby for "speed"-selecting purposes.

For a better understanding of the objects and advantages of this invention reference may be directed to the following description taken in connection with the accompanying drawings, in which.

Figure 1:
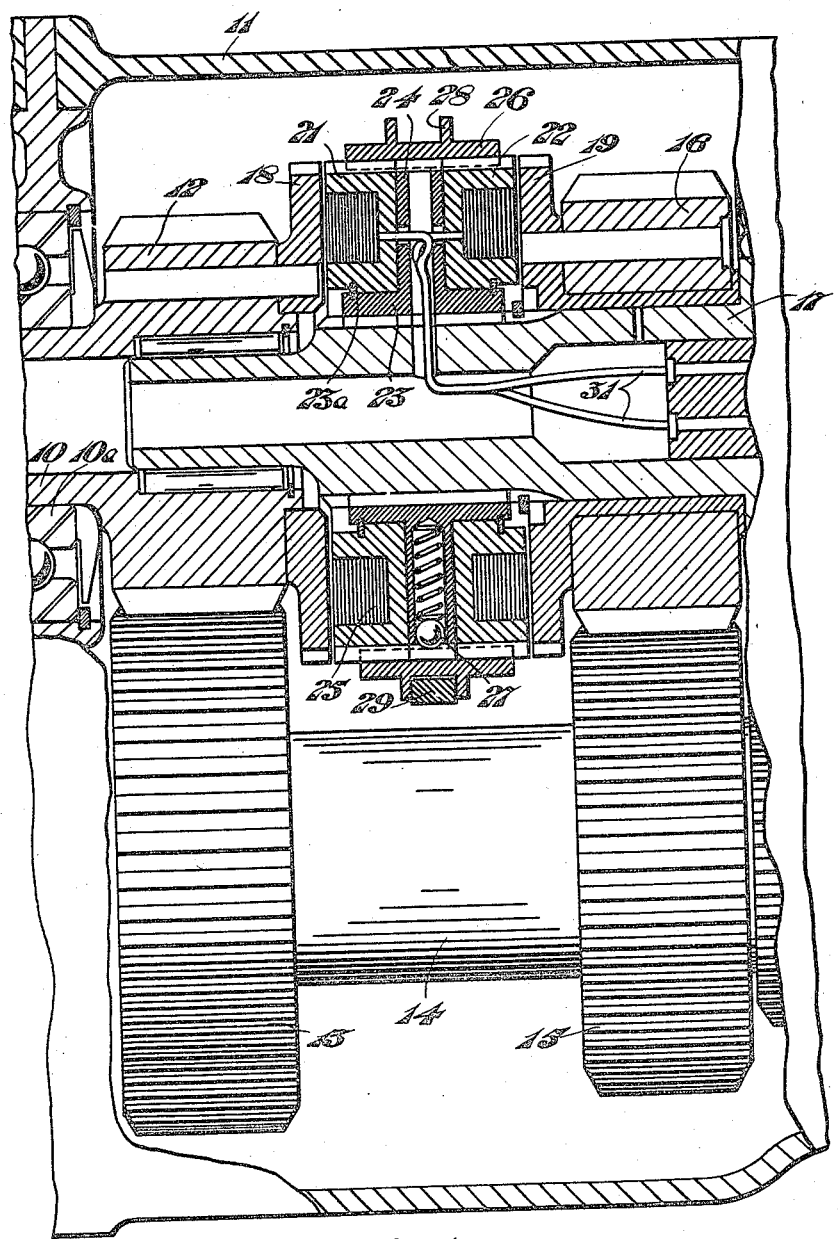
Figure 1 is a fragmentary sectional elevation showing a change-speed mechanism having the top and next "speed" introduced by means of dog clutches and electromagnetic synchronizing clutches for the control of which latter the actuating means of the invention is very satisfactory.

In the construction of Figure 1, 10 represents the tail end of a driving shaft journalled in bearings 10a in a gear casing 11. Fast on the driving shaft is a gear 12 in permanent mesh with a gear 13 fast on a layshaft 14. 15 is a gear fast on the layshaft and in permanent mesh with a gear 16 free on a driven shaft 17.

A double-acting slidable device is mounted as usual on the driven shaft between two externally-toothed dog clutch elements 18, 19 of magnetic material. One of these (18) is fast with the driving shaft and the other (19) is free upon the driven shaft, being fast with the free gear 16 thereon. This device includes a carrier for two electromagnets 21, 22 which are adapted to coact, respectively, with the adjacent flat radial faces of the dog clutch elements aforesaid. The carrier comprises a hub portion 23 slidably splined upon the driven shaft, and a central radially-extending flange portion 24 against which the two electromagnets 21, 22 rest, being rotatably mounted thereon and endwise held by spring rings 23a. Each of the electromagnets comprises an outwardly-facing, channel-section annulus of magnetic material with an appropriate coil 25 disposed in the interior thereof.

The outer periphery of the flange portion 24 of the carrier has a sliding and driving engagement with a slidable, double-ended, dog clutch sleeve 26 which in its extreme positions can engage with one or other of the dog clutch elements 18, 19. The dog clutch sleeve also has a sliding and driving engagement with the two electromagnets 21, 22, thus restricting them from rotating on the carrier.

In addition, a spring-loaded ball 27 mounted in the carrier serves for centralizing the carrier with respect to the dog clutch sleeve, and the latter has a peripheral groove 28 engaged by a striking fork 29. Current for the two coils can be brought along leads 31 provided in the interior of the driven shaft, the leads emerging through a radial hole therein into the interior of the flange of the carrier, whence they are connected to the respective coils.

Assuming that the parts of the mechanism are in the neutral position shown, movement of the change-speed lever in a direction to introduce, say, top "speed," causes the operation of appropriate switch contacts (as hereinafter described) whereby a circuit for the associated coil 25 is closed, whilst at the same time the dog clutch sleeve and synchronizing device are moved slightly in the appropriate direction as a whole—to the left in Figure 1 for top "speed." The electromagnetic attraction resulting from the energization of the coil tends to cause the electromagnet 21 to revolve in synchronism with the adjacent dog clutch element 18, and this electromagnet 21, being free to rotate on the carrier except for the sliding and driving connection between it and the dog clutch sleeve 26 and between the latter and the carrier, introduces a frictional resistance which is operative for discouraging sliding movement of the dog clutch sleeve until synchronization has been reached. Thereupon the further axial movement of the dog clutch sleeve can take place relatively freely; and before engagement between the dog clutch elements occurs the circuit is preferably broken at the said contacts, thus allowing the actual engagement of the dogs to take place freely.

The contacts are arranged so that, when changing down from top "speed," the movement of the dog clutch sleeve into the neutral position does not complete a circuit for either coil 25. The operation of moving from neutral to the "speed" below top "speed" is similar in all respects to that described.

Figure 2:
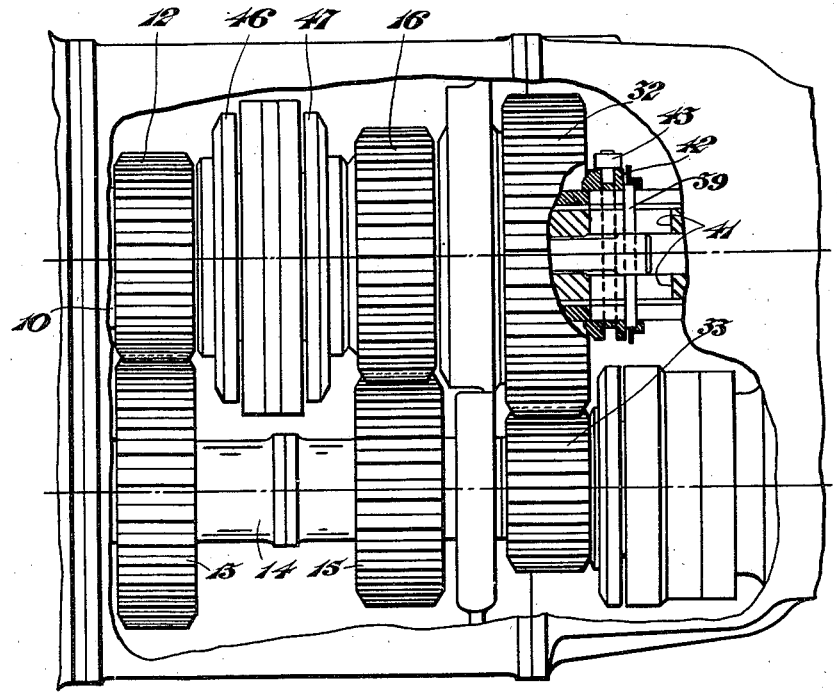
Figure 2 is an elevation, to a smaller scale, of another form of gear-box, arranged to give three forward "speeds," having electromagnetic synchronizing means for each forward "speed," which can be controlled by means of the invention.
Figures 3, 4:
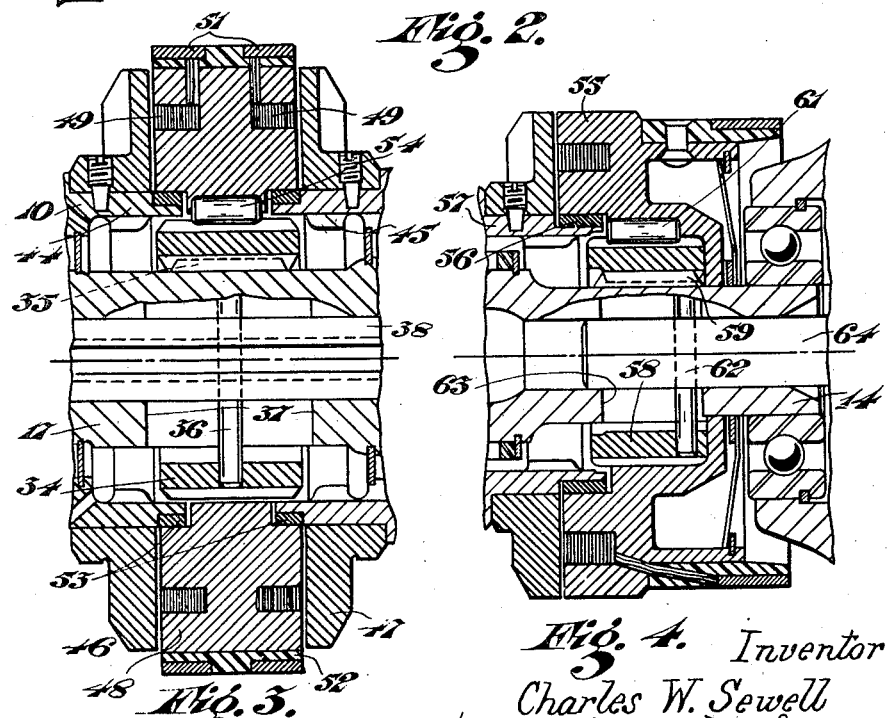
Figure 3 is a sectional elevation, to a larger scale, of the device of Figure 2 for introducing third "speed" (direct drive) and second "speed"
Figure 4 is a sectional elevation, also to the larger scale, of the device of Figure 2 for introducing first "speed"

In the construction shown by Figures 2 to 4, 10 again represents a driving shaft, 12 a gear fast thereon and in permanent mesh with a gear 13 fast on a layshaft 14, and 15 is a gear fast on the layshaft and in permanent mesh with a gear 16 free on the driven shaft 17. Figure 2, in addition, shows a gear 32 fast on the driven shaft and in permanent mesh with a gear 33 free on the layshaft for first "speed." Moreover, in each case, the synchronizing device includes an electromagnetic clutching means disposed exteriorly of the slidable dog clutch element. Thus, the synchronizing device for introducing top or second "speed" includes a slidable dog clutch element 34 which is slidably splined at 35 upon the driven shaft and internally engaged by a cross pin 36 working in longitudinal slots 37 in the driven shaft. The cross pin is engaged by a rod 38 disposed in the interior of the shaft and carrying a cross pin 39 which works in slots 41 in the shaft and is connected externally of the shaft to a grooved ring 42 engaged with a striker fork 43. In the present instance the dog clutch elements 44, 45, which are fast with the gears 12 and 16, respectively, are formed integrally therewith, and secured thereto are flanges 46, 47 of magnetic material for coacting with the interposed electromagnetic member 48 having in its interior the two exciting coils 49.

Current for the coils can be brought in by slip rings 51 which are respectively connected to the coils, the other ends of the latter being earthed to the electromagnetic member 48 which should be formed of a material having a small residual magnetism. The slip rings are insulated from the electromagnet by an insulating ring 52. The electromagnetic ring 48 is freely journalled and slidably mounted on bronze rings 53 mounted on the positive clutch elements 44, 45. In addition, the electromagnetic member 48 has a frictional sliding and driving connection with the slidable dog clutch element, which connection is indicated diagrammatically at 54. The elements 54 and 61 act in the manner of splines and these elements may be replaced by splines if desired.

In the case of first "speed" the parts are arranged in a substantially similar manner, except that here the electromagnetic member 55 is a single-acting one journalled partly on a bronze ring 56 carried by the positive clutch element 57 which is fast with the gear 33 and, on the other side of the slidable positive clutch element 58, on the lay shaft. The slidable positive clutch element, which is slidingly splined at 59 on the layshaft and has a frictional connection 61 with the electromagnetic member 55, has a cross pin 62 working in slots 63 in the layshaft and connected by a rod 64 leading to the end of the layshaft where it can be actuated by an appropriate mechanism.

It is believed that the manner in which first, second or third "speed" can be introduced, on the sliding of the appropriate dog clutch element, will readily be understood from the description given in connection with Figure 1.

Figure 5:
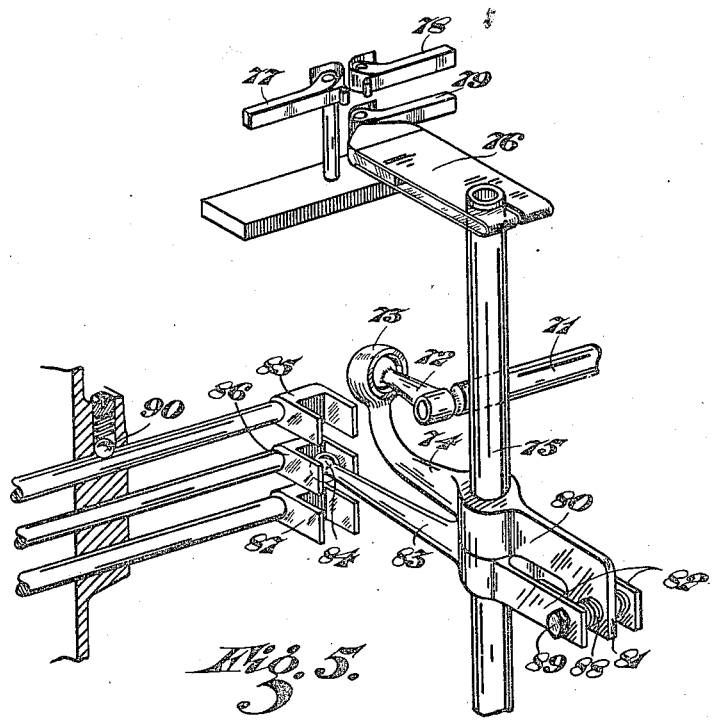
Figure 5 is a perspective view of an actuating means, according to the invention, shown in association with three selector fork bars by means of which the striker forks of the change-speed mechanism of Figures 2 and 4 can be actuated.
Figure 6:
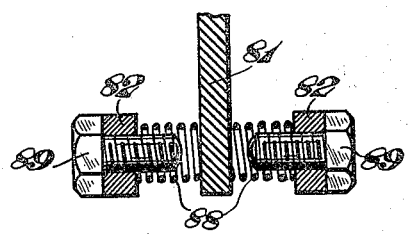
Figure 6 is a sectional view of the lost-motion connection of Figure 5.

The manner in which the slidable dog-clutch elements may be actuated will be ascertained from a consideration of Figures 5 and 6. These show a shaft 71 which is rotatable for selecting purposes and axially-movable for actuating a selected striker fork. This shaft may be arranged to extend through the casing (not shown) of the change-speed mechanism and to be actuated. Fast on the shaft is an arm 72 carrying at its free end a ball engaged in a socket 73 of an arm 74 which is fast on a rod 75. Fixed on the latter is an actuating member 76 for three switch mechanisms which are diagrammatically indicated at 77, 78 and 79. (These are assumed to be as disclosed in the specification accompanying co-pending patent application No. 343,507 filed July 1, 1940.) The arm 74 is also formed integrally with an arm 80 having a tail 81 which is disposed with clearance between the limbs 82 of a fork 83 rotatively mounted upon the rod 75 but endwise fast thereon. At its other end the fork 83 carries a ball 84 adapted to coact with the selector forks 85, 86 and 87. 85 is the selector fork by means of which third and second "speeds" are introduced, and 86 that for first "speed," 87 being that for the reverse drive. (The change-speed mechanism in question is one with three forward speeds and a reverse gear, no synchronizing means being provided for the reverse gear.)

In the construction shown, it is the selector fork 86, i. e., that for first "speed," which is engaged by the fork 83, and in this axial position of the rod 75 the actuating member 76 is coacting with the switch mechanism 79. Axial movement of the shaft 71 to the right (Figure 5) will swing the actuating member 76 towards the switch mechanism 79 in order to effect the energization of the electromagnet associated with first "speed," whilst the lost motion between the tail 81 and appropriate limb of the fork is being taken up. On this being taken up, and on energization having been effected, the further axial movement of the shaft 71 in the same direction actuates the selector fork 86 to the right (Figure 5) to engage first "speed."

The lost-motion connection preferably includes compression springs 88 interposed between the limbs of the fork and the tail 81, these springs being supported upon screws 89 carried by the fork and the inner ends of which form stops for determining the amount of lost motion to be permitted. Each of the selector fork bars is biassed to remain in a neutral position as by means of a spring-pressed ball 90 coacting with a groove in the bar as shown for the bar of the selector fork 85. The arrangement is such that in each case the switch mechanism concerned can be actuated by the actuating member 76 before any movement of the associated selector fork bar is effected. On the return axial movement of the shaft 71 the previously-engaged dog clutch is released, the appropriate spring 88 returning the selector fork bar to the neutral position.

To engage reverse gear the shaft 71 is rotated in the direction necessary to slide the rod 75 downwardly (Figure 5), thus to carry the fork 83 into engagement with the selector fork 87, and for second or third "speed" the shaft 71 is turned in the other direction to raise the rod (Figure 5) so as to bring the actuating member 76 in a position to coact with the switch mechanisms 77 and 78 and the fork 83 into engagement with the selector fork 85. Obviously, axial movement of the shaft 71 in one or the other direction will then cause the actuating member to coact with one or other of the switch mechanisms 77, 78 and will also effect the sliding in a corresponding direction of the selector fork 85 according to whether second or third "speed" is to be engaged.

What I claim as my invention and desire to secure by Letters Patent of the United States is:

1. In a change-speed mechanism, actuating means including a pair of selector forks, a finger adapted to coact therewith, said finger being rotatable on a shaft for actuating the selected selector fork, said finger being endwise fast on said shaft, means for moving said shaft axially to cause said finger to select one of said selector forks, a pair of switch mechanisms, an actuating member for said switch mechanisms fast on said shaft, said switch mechanisms being arranged whereby axial movement of said shaft will bring said actuating member into position adjacent one or the other thereof, an arm fast on said shaft for effecting the rotation and axial movement thereof, and a lost-motion connection for transmitting rotation of said arm to said finger, said lost-motion connection including a tail on said arm, a fork fast with said finger, said tail interposed between the limbs of said fork, compression springs acting between said tail and the limbs of said fork, and abutment screws carried by the limbs of said fork.

2. In a change-speed mechanism, actuating means including a pair of selector forks, a finger adapted to coact therewith, said finger being rotatable on a shaft for actuating the selected selector fork, said finger being endwise fast on said shaft, means for moving said shaft axially to cause said finger to select one of said selector forks, a pair of switch mechanisms, an actuating member for said switch mechanisms fast on said shaft, said switch mechanisms being arranged whereby axial movement of said shaft will bring said actuating member into position adjacent one or the other thereof, an arm fast on said shaft for effecting the rotation and axial movement thereof, and a lost-motion connection for transmitting rotation of said arm to said finger, said lost-motion connection including a tail on said arm, a fork fast with said finger, said tail interposed between the limbs of said fork, and compression springs acting between said tail and the limbs of said fork, and abutment screws carried by the limbs of said fork.

3. In a change-speed mechanism, actuating means including a double-acting selector fork, a shaft, a finger rotatable on said shaft for actuating said selector fork, a pair of oppositely-disposed switch mechanisms, an actuating member for said switch mechanisms fast on said shaft, an arm fast on said shaft for effecting the rotation thereof, and a lost-motion connection for transmitting rotation of said shaft to said finger, said lost-motion connection including abutment screws carried by said finger and coacting with opposite sides of said arm, and compression springs acting against said arm and located by said screws.

CHARLES W. SEWELL.